US008480349B2

(12) United States Patent
Hiltscher

(10) Patent No.: US 8,480,349 B2
(45) Date of Patent: Jul. 9, 2013

(54) DEVICE FOR LONGITUDINAL ADJUSTMENT OF A SPREADER

(75) Inventor: Roman Hiltscher, Kitzingen (DE)

(73) Assignee: Noell Mobile Systems GmbH, Wüzburg (DE)

( * ) Notice: Subject to any disclaimer, the term of this patent is extended or adjusted under 35 U.S.C. 154(b) by 477 days.

(21) Appl. No.: 12/152,198

(22) Filed: May 13, 2008

(65) Prior Publication Data

US 2008/0292440 A1 Nov. 27, 2008

(30) Foreign Application Priority Data

May 25, 2007 (DE) ........................ 10 2007 024 664

(51) Int. Cl.
*B60P 3/00* (2006.01)

(52) U.S. Cl.
USPC .......... 414/460; 414/626; 294/81.1; 294/81.2

(58) Field of Classification Search
USPC ............. 414/460, 626; 294/81.1, 81.2, 81.21, 294/81.53
See application file for complete search history.

(56) References Cited

U.S. PATENT DOCUMENTS

| | | | | |
|---|---|---|---|---|
| 4,093,090 | A | 6/1978 | Whiteman | |
| 4,266,904 | A * | 5/1981 | Fadness | 414/460 |
| 6,431,379 | B1 | 8/2002 | Kröll et al. | |

FOREIGN PATENT DOCUMENTS

| | | |
|---|---|---|
| DE | 199 57 823 | 5/2001 |
| DE | 103 55 946 | 7/2005 |
| DE | 20 2006 017 624 | 3/2007 |
| EP | 1 132 328 | 9/2001 |

* cited by examiner

*Primary Examiner* — Saul Rodriguez
*Assistant Examiner* — Willie Berry, Jr.
(74) *Attorney, Agent, or Firm* — Collard & Roe, P.C.

(57) ABSTRACT

A device for longitudinal adjustment of a spreader relative to the yoke beam with a sled for lateral adjustment of the spreader between the supports of a straddle carrier for picking up and transporting containers includes a base frame and mountings for support bolts firmly connected with it, a traverse with openings for support bolts and an attachment for a displacement cylinder, support bolts between the mountings and the traverse, and displacement cylinders between the base frame and the traverse.

9 Claims, 5 Drawing Sheets

16
9
21
20
19
8
15
12
13
10
11
7
24
22
12

DEVICE FOR LONGITUDINAL ADJUSTMENT OF A SPREADER

CROSS REFERENCE TO RELATED APPLICATIONS

Applicant claims priority under 35 U.S.C. §119 of German Application No. 10 2007 024 664.3 filed May 25, 2007.

BACKGROUND OF THE INVENTION

1. Field of the Invention

The present invention relates to a device for longitudinal adjustment of a spreader relative to the yoke beam with a sled for lateral adjustment of the spreader between the supports of a straddle carrier for picking up and transporting containers. The device is made up of a base frame and mountings for support bolts firmly connected with it, a traverse with openings for support bolts and an attachment for a displacement cylinder, support bolts between the mountings and the traverse, and displacement cylinders between the base frame and the traverse.

The invention can be used anywhere where spreaders are disposed between the supports of a portal lift truck via yoke beams and their sleds for lateral adjustment of the spreader, and where longitudinal positioning of the spreader must take place without the lift truck moving in the longitudinal direction relative to the container.

2. The Prior Art

Spreaders for grasping and transporting containers are known both on portal cranes and on portal lift trucks. The portal lift trucks, so-called straddle carriers, serve to pick up containers on land, transport them, and set them down again at a specific point. Spreaders are provided as the load accommodation means for holding and transporting the container. They can be adjusted to various container sizes and have four twist lock accommodations. These twist lock accommodations engage into the corners of the container, are rotated, and thereby produce a releasable connection between the spreader and the container.

A spreader for picking up and transporting containers on a straddle carrier is known from DE 103 55 946 A1. In this spreader, a direct suspension between each yoke beam and the spreader is present. The coupling points are directly set by an adjustment device and adjusted in the longitudinal direction relative to the spreader, and a connection construction is disposed between each yoke beam and each suspension point. The adjustment devices disposed laterally, which represent cylinders, however, also serve for suspension of the spreader, in part, thereby causing great bending forces to act on the cylinders and to lead to their premature wear.

A spreader for transporting containers is known from U.S. Pat. No. 4,093,090, which consists of two frames that are displaceable, relative to one another, in the longitudinal direction, whereby this spreader is not suitable for attachment to a sled that is disposed within a yoke beam, which is situated on the supports of a straddle carrier.

A spreader with flat guidance for picking up and transporting containers on a straddle carrier is described in DE 20 2006 017 624 1, which spreader is disposed on two yoke beams with laterally adjustable sleds, whereby yoke beams are guided between the supports of a straddle carrier. Two containers at the same time, in each instance, can be picked up with the spreader. A connection crosspiece relieves stress on the adjustment devices, and hydraulic cylinders are disposed parallel to the connection crosspieces as adjustment devices. These spreaders, too, demonstrate great wear, because the connection crosspieces are exposed to very great stresses even if the device is designed for only one container. Furthermore, this device also results in a disadvantageous height for the vehicle.

SUMMARY OF THE INVENTION

Proceeding from this state of the art, it is an object of the present invention to provide a device for longitudinal adjustment of a spreader, which spreader does not have the disadvantages of the state of the art and has low wear and a long useful lifetime.

These and other objects are accomplished by a device according to the invention. Advantageous embodiments of the invention are discussed below.

According to the invention, a device is provided for longitudinal adjustment of a spreader relative to the yoke beam with a sled, for lateral adjustment of the spreader between the supports of a straddle carrier, which device is made up of the following parts:

- a base frame and mountings for support bolts firmly connected with it,
- traverses with openings for support bolts and an attachment for a displacement cylinder,
- support bolts between the mountings and the traverse, and
- displacement cylinders between the base frame and the traverses.

In this connection, four support bolts, which are sized in accordance with the loads that occur, are disposed laterally on the base frame, i.e. two on each side, and displacement cylinders that act relative to one another above the base frame.

Attachment possibilities or points for attachment to the yoke beam are disposed at the end of each support bolt. The attachment possibilities are generally bolts on which non-rigid suspensions, for example chains, are suspended, which are disposed between the sleds of the yoke beam and the attachment possibility.

Advantageously, hydraulic cylinders are used as displacement cylinders. Furthermore, it is advantageous to transfer the movement of the sled to the spreader via a driver, which is an integral part of the spreader and disposed on each longitudinal side.

The two displacement cylinders are mounted in articulated manner at their two ends. In this way, the cylinders do not have to absorb any kind of bending forces. Furthermore, the construction between the mountings and the support bolts and the positioning of the support bolts at an end of the base frame, in each instance, is the prerequisite for keeping the wear at moving parts of the spreader very slight.

Advantageously, a pulling mechanism is disposed between the traverses. In this way, another advantageous possibility exists for reducing tensions between the supports of the straddle carrier caused by the displacement cylinders, and thereby minimizing wear at the moving parts.

The device according to the invention has the advantage that longitudinal adjustment of the spreader relative to the yoke beams is possible, without great wear occurring at the moving parts of the spreader.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
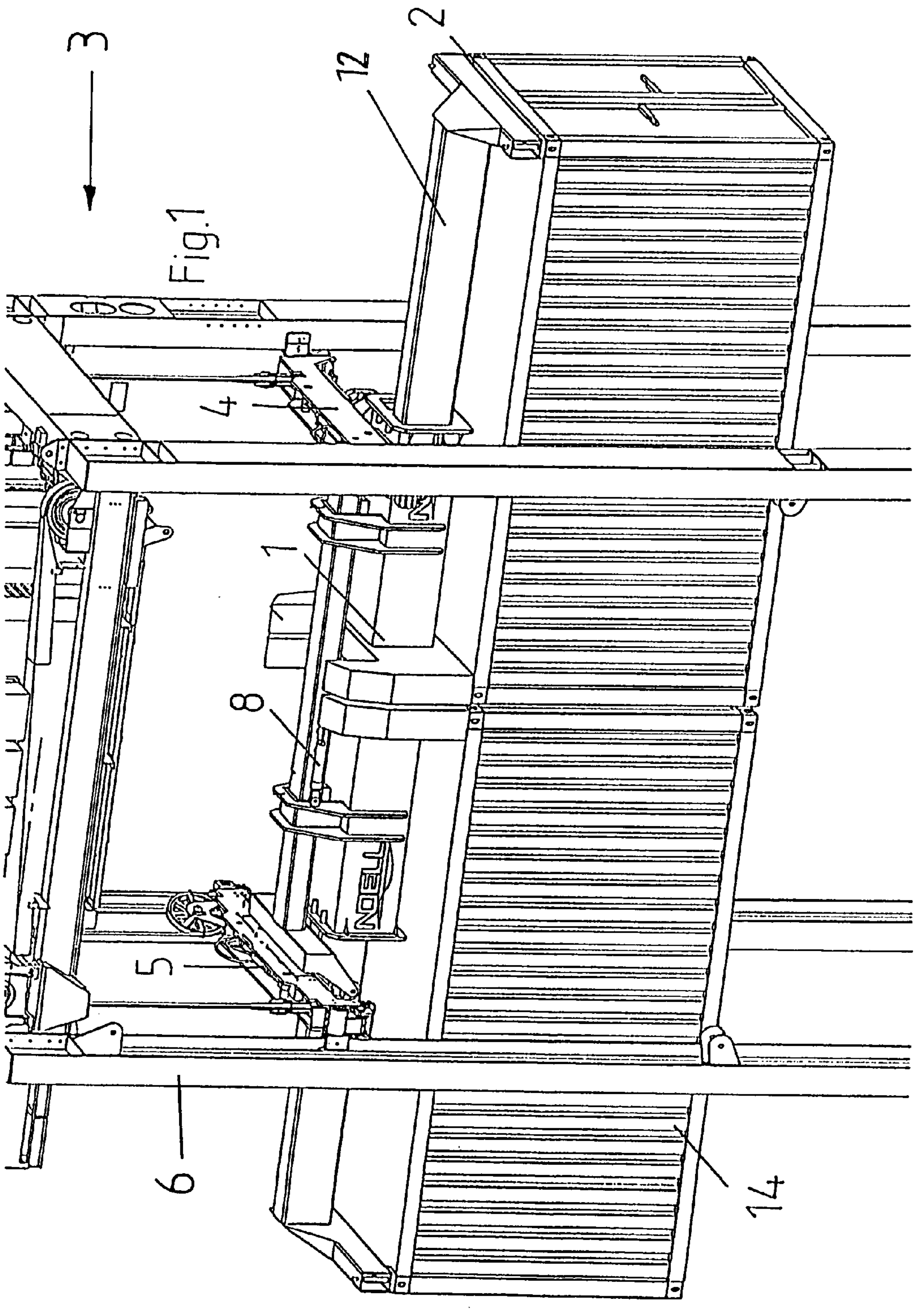
FIG. 1 shows the state of the art of a spreader on the traverse with sled between the supports of the straddle carrier.

Referring now in detail to the drawings, FIG. 1 shows the state of the art of a spreader 1 on the yoke beam 4 of a straddle carrier 3. Yoke beam 4 has a sled 5 for crosswise displacement of spreader 1 relative to the supports 6 of straddle carrier 3. The pusher 12 with twist lock accommodations 2 can be moved out of spreader 1 and is adapted to the length of the containers 14. A movement cylinder 8 is disposed laterally on spreader 1 for longitudinal displacement of spreader 1, whereby the entire device is displaced on a rail above the spreader. This spreader 1 has the disadvantages mentioned initially, particularly great wear and an overly great construction height.

Figure 2:
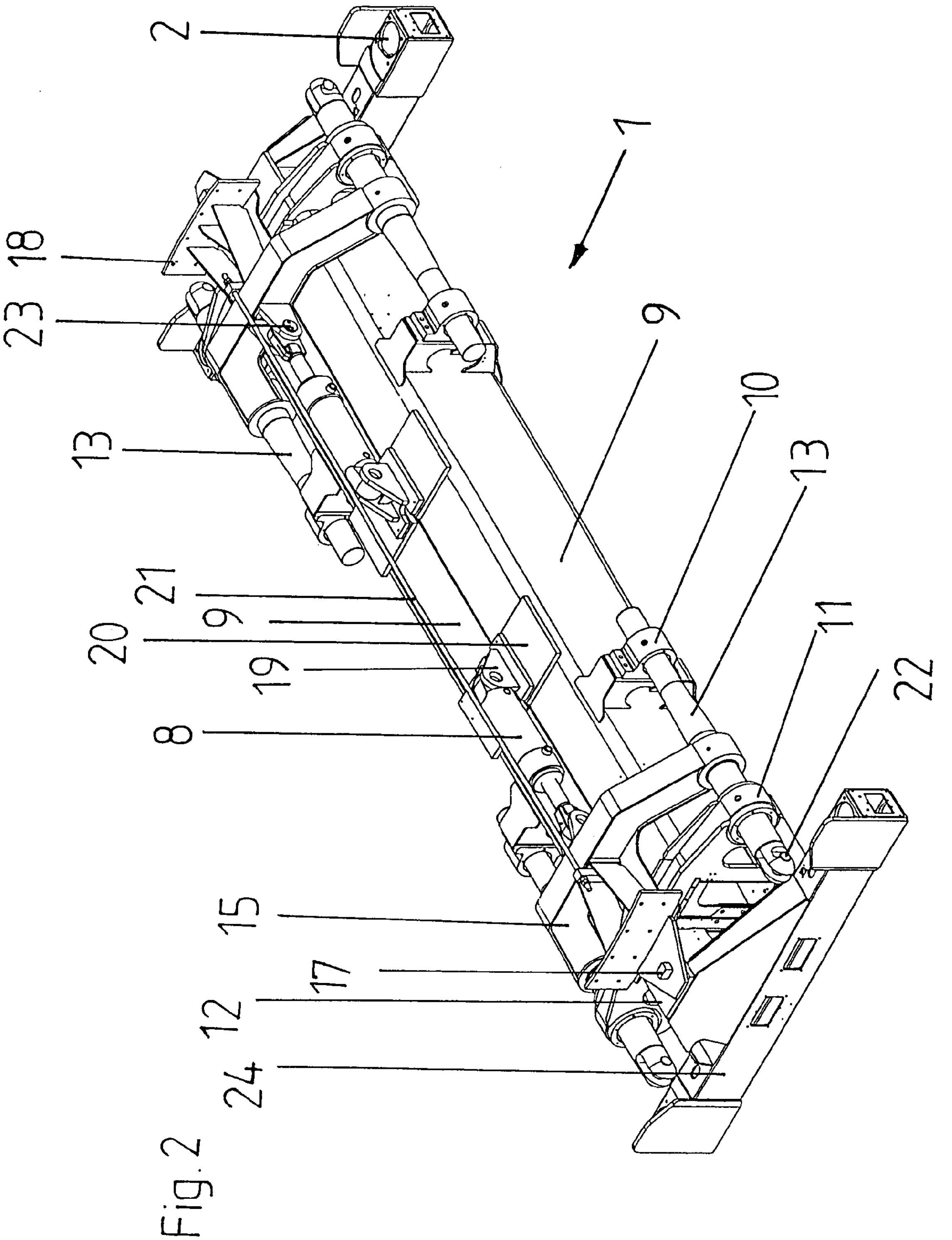
FIG. 2 is a perspective view of the device for adjustment according to an embodiment of the invention.

FIG. 2 shows a spreader 1 according to the invention; the pushers 12 project out of its base frame 9, in the longitudinal direction, on both sides, and the head beams 24 with twist lock accommodations 2 are disposed on them. The rear mounting 10 and the front mounting 11 are disposed laterally on base frame 9; support bolts 13 are displaceably disposed in their openings. Support bolts 13 of a type that has attachment points 22 for a non-rigid suspension 16 at their ends are disposed at each corner of the base frame 9. Furthermore, support bolts 13 pass through a traverse 15, in each instance, on both sides, which are connected with a sled 5, not shown in FIG. 2, of yoke beam 4, by way of a support 18 and a driver 17 for the adjustment of sled 5 of yoke beam 4.

Two displacement cylinders 8 are disposed on a connection plate 20, between base frame 9 and traverse 15, to which cylinders the bearing block 19 is attached for attachment of cylinders 8 to base frame 9. In this way, spreader 1 may be displaced longitudinally relative to container 14 by pushing out the cylinder rods. Because these are displacement cylinders 8, pressure fluid is pressed into the pushing cylinder, while the fluid leaves pushed cylinder 8.

A pulling rod 21 is disposed between traverses 15, which is adjusted in such a manner that the two traverses 15 are always moved parallel and reduce friction forces between supports 18 to yoke beam 4 and on supports 6 of the straddle carrier.

Figures 4, 5, 6:
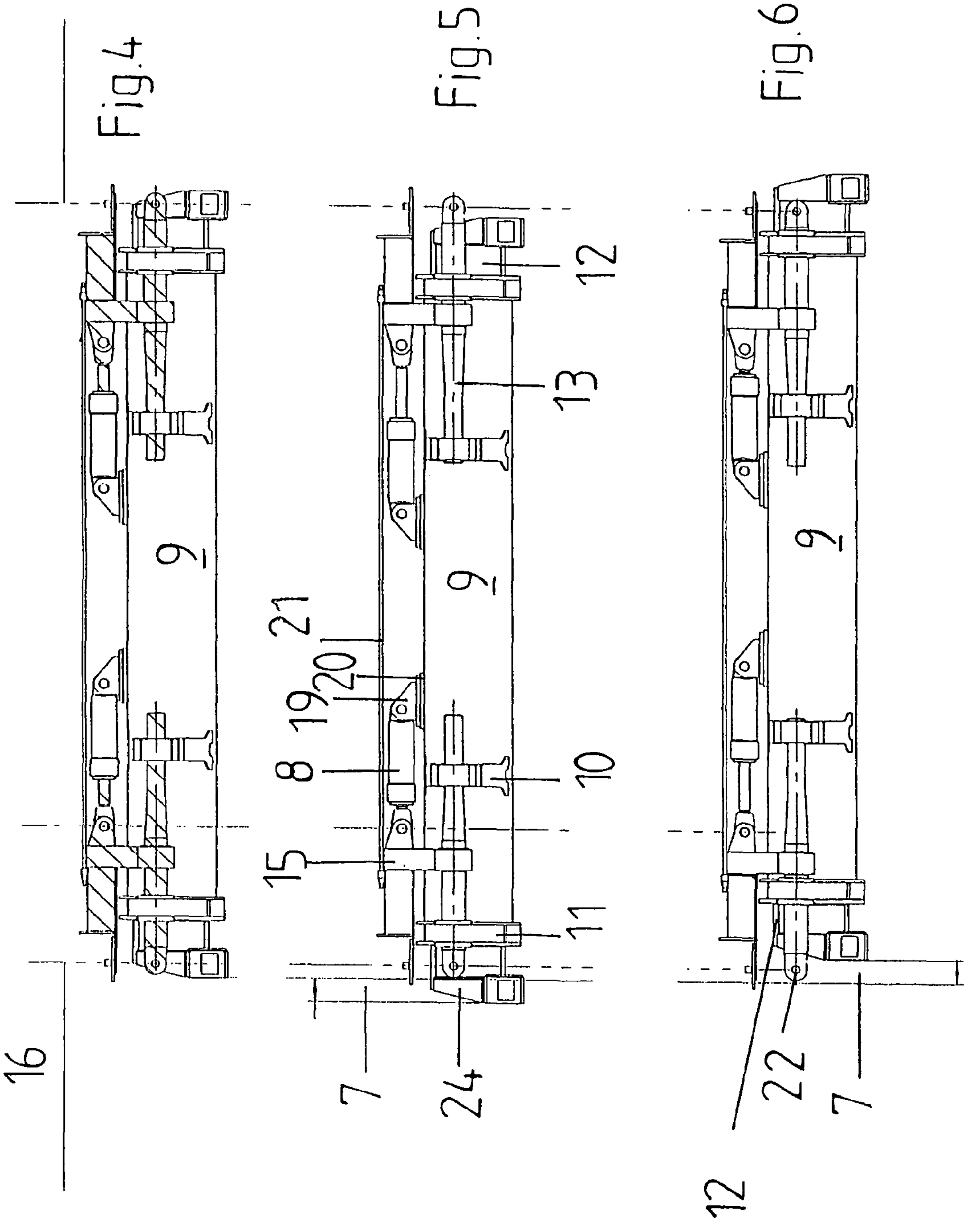
FIG. 4 is a side view of the device according to an embodiment of the invention in the zero position.
FIG. 5 is a side view of the device according to an embodiment of the invention displaced to the left.
FIG. 6 shows the device according to an embodiment of the invention displaced to the right.

Attachment 23 between displacement cylinder 8 and traverse 15 represents a bolt, so that no tensions occur between displacement cylinder 8 and traverse 15. The same holds true for the attachment between displacement cylinder 8 and bearing block 19. When displacement cylinder 8 is moved out, spreader 1 moves to the right or left by the displacement path 7, as shown in FIGS. 4-6.

Figure 3:
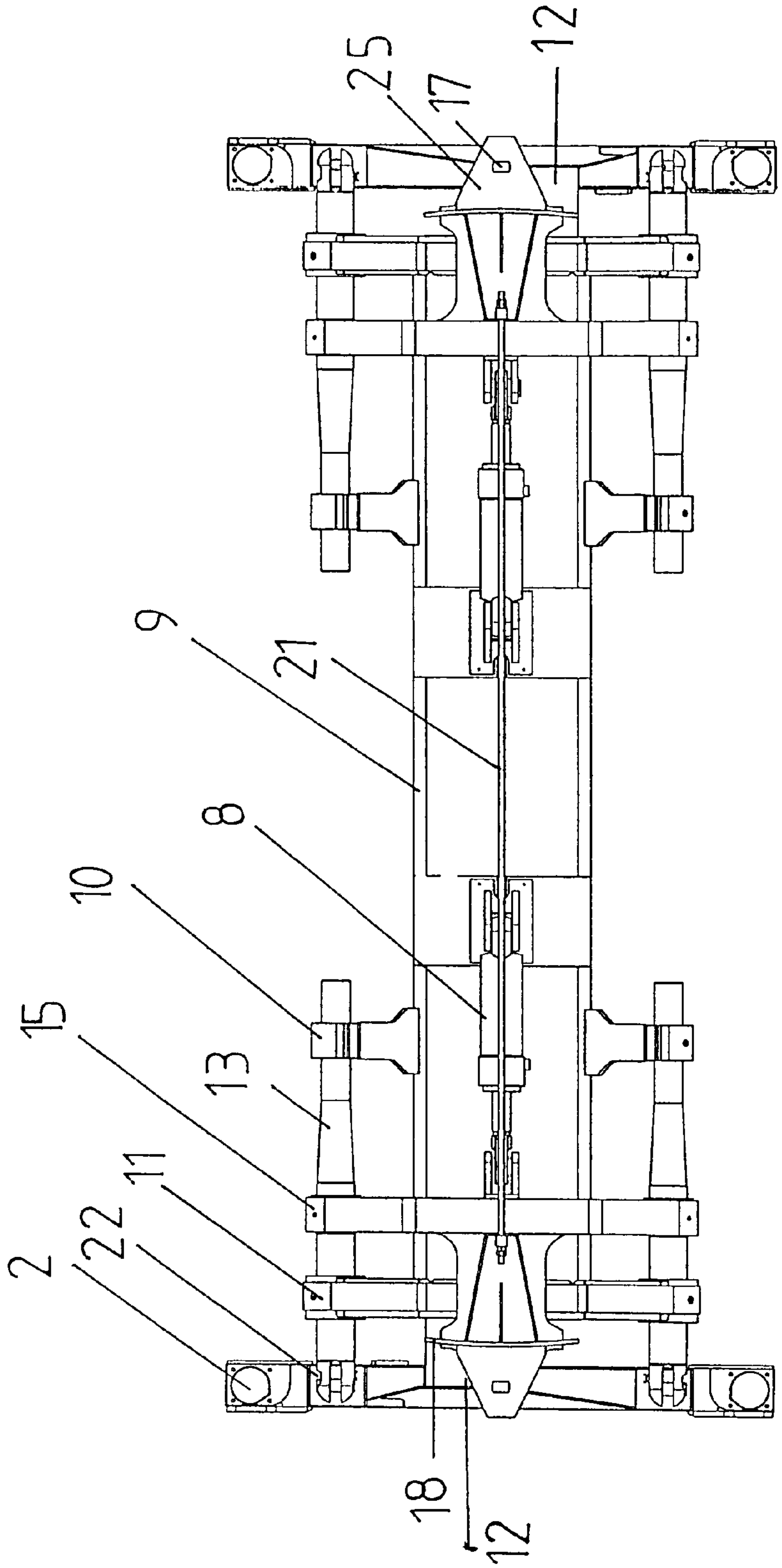
FIG. 3 is a top view of the device of FIG. 2.

FIG. 3 shows a view from the top onto the device according to FIG. 2 to clarify the arrangement of base frame 9 and mountings 10, 11, as well as support bolts 13 and traverse 15 and the attachment plate 25 for driver 17.

Figure 7:
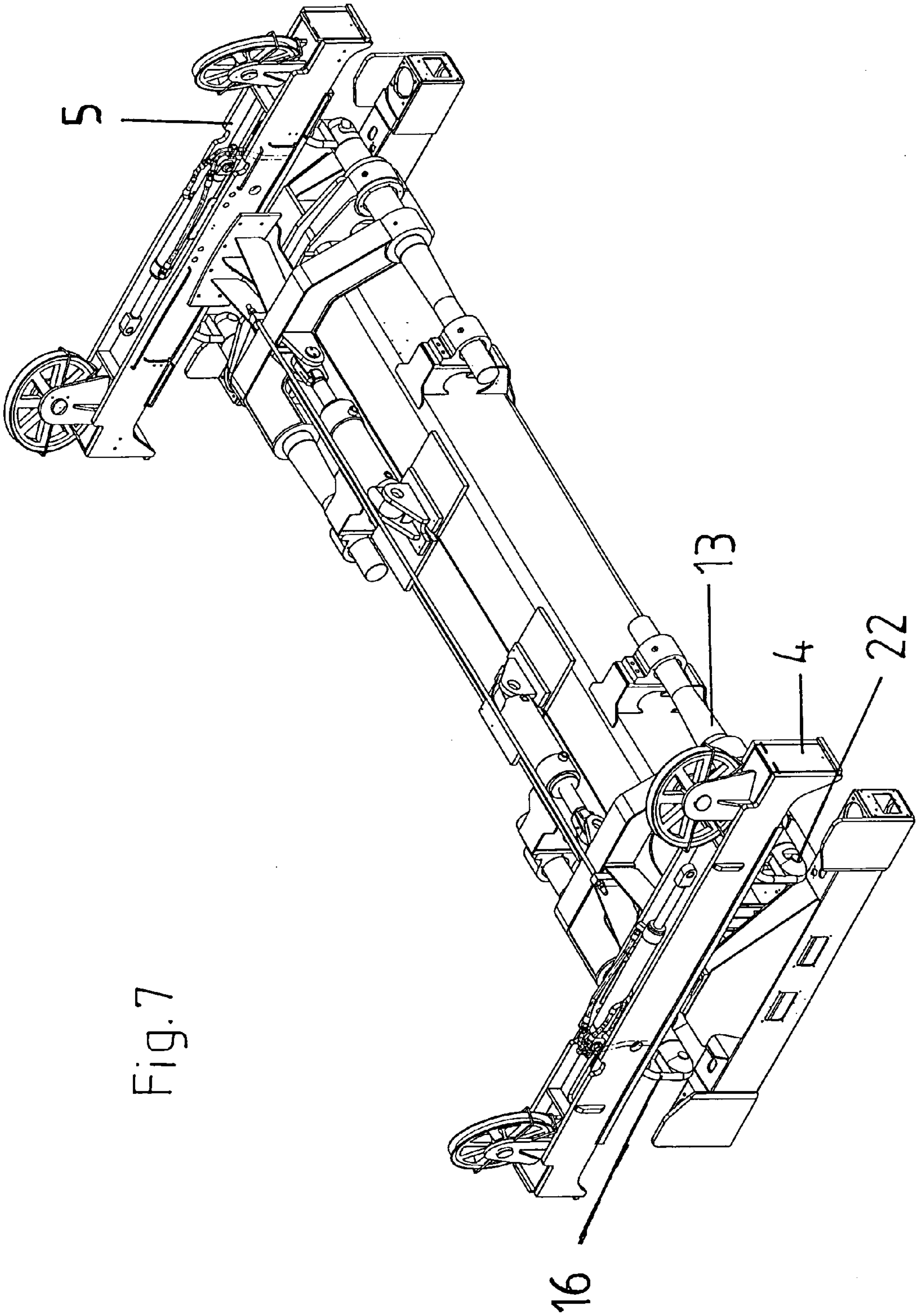
FIG. 7 shows a spreader on the yoke beam.

Spreader 1 on yoke beam 4 can be seen in FIG. 7. The non-rigid suspensions represent chains 16, which are disposed between attachment points 22 on support bolt 13 and sled 5 on yoke beam 4.

Although at least one embodiment has been shown and described, it is to be understood that many changes and modifications may be made thereunto without departing from the spirit and scope of the invention as defined in the appended claims.

What is claimed is:

1. A device for longitudinal adjustment of a spreader relative to a yoke beam with a sled for lateral adjustment of the spreader between supports of a straddle carrier for picking up and transporting containers comprising:

(a) a base frame;

(b) first and second mountings connected to said base frame, each mounting having openings for support bolts;

(c) a first traverse having openings for the support bolts and an attachment for a displacement cylinder;

(d) the support bolts being displaceably disposed in the openings of the mountings; and (e) a plurality of displacement cylinders disposed between the base frame and the first traverse;

wherein each support bolt is slidably disposed in one of the openings of the first mounting and in one of the openings of the second mounting, and each support bold is arranged in one of the openings of the first traverse.

2. The device according to claim 1, further comprising attachment points for attachment to the yoke beam disposed at ends of the support bolts.

3. The device according to claim 1, further comprising a respective non-rigid suspension between each sled of a yoke beam and an associated attachment point.

4. The device according to claim 1, wherein said plurality of displacement cylinders comprises first and second displacement cylinders acting against one another, in each instance.

5. The device according to claim 1, wherein said displacement cylinders are disposed above the base frame.

6. The device according to claim 1, wherein each displacement cylinder is a hydraulic cylinder.

7. The device according to claim 1, further comprising a second traverse and a pulling mechanism between the traverses.

8. The device according to claim 1, further comprising a driver for the sled of the yoke beam.

9. A device for longitudinal adjustment of a spreader relative to a yoke beam with a sled for lateral adjustment of the spreader between supports of a straddle carrier for picking up and transporting containers comprising:

a) a base frame comprising a longitudinal direction;

b) a first adjustment unit disposed at a first end regarding the longitudinal direction of the base frame; and c) a second adjustment unit disposed at a second end regarding the longitudinal direction of the base frame, each adjustment unit comprising:

i) a head beam with twist lock accommodations to be locked with a container;

ii) a traverse being displaceable along the longitudinal direction relative to the base frame and comprising two traverse-openings being arranged in a plane perpendicular to the longitudinal direction;

iii) two support bolts, wherein each support bolt is arranged parallel to the longitudinal direction and passes through one of the traverse-openings;

iv) a movement cylinder being articulated with a first end to the base frame and with a second end to the traverse;

v) a pair of first mountings being attached to the base frame, wherein each first mounting has a mounting-opening and wherein the mounting-openings are arranged in a plane perpendicular to the longitudinal direction; and vi) a pair of second mountings being attached to the bae frame, wherein each second mounting has a mounting-opening and wherein the mounting-openings are arranged in a plane perpendicular to the longitudinal direction;

wherein the traverse is arranged along the longitudinal direction between the pair of first mountings and the pair of second mountings; and wherein each support bolt is displaceably disposed in a corresponding mounting-opening of one of the first mountings and in a corresponding mounting-opening of one of the second mountings.

* * * * *